(12) United States Patent
Surgeon et al.

(10) Patent No.: US 8,132,863 B2
(45) Date of Patent: Mar. 13, 2012

(54) VEHICLE SEAT

(75) Inventors: Matthew Surgeon, Carlisle (GB); John Bell, Carlisle (GB)

(73) Assignee: Key Safety Systems, Inc, Sterling Heights, MI (US)

( * ) Notice: Subject to any disclaimer, the term of this patent is extended or adjusted under 35 U.S.C. 154(b) by 98 days.

(21) Appl. No.: 12/331,475

(22) Filed: Dec. 10, 2008

(65) Prior Publication Data

US 2010/0127553 A1 May 27, 2010

(51) Int. Cl.
*B60R 22/00* (2006.01)

(52) U.S. Cl. .......................... 297/473; 297/474

(58) Field of Classification Search .................. 297/464, 297/468, 473, 483, 250.1, 474, 475, 469, 297/484
See application file for complete search history.

(56) References Cited

U.S. PATENT DOCUMENTS

| | | | | |
|---|---|---|---|---|
| 2,365,626 | A * | 12/1944 | Carlisle | 297/484 |
| 3,219,387 | A * | 11/1965 | Peters | 297/474 |
| 3,583,764 | A * | 6/1971 | Lohr et al. | 297/475 |
| 4,047,755 | A * | 9/1977 | McDonald et al. | 297/216.11 |
| 4,275,923 | A | 6/1981 | Molnar | |
| 4,463,984 | A | 8/1984 | Molnar | |
| 4,603,903 | A | 8/1986 | Moscovitck | |
| 4,796,919 | A * | 1/1989 | Linden | 280/808 |
| 5,186,520 | A * | 2/1993 | Whitaker et al. | 297/468 |
| 5,409,294 | A | 4/1995 | Czernakowski | |
| 5,441,332 | A * | 8/1995 | Verellen | 297/483 |
| 5,609,367 | A * | 3/1997 | Eusebi et al. | 280/808 |
| D385,116 | S | 10/1997 | Kiser et al. | |
| 5,797,654 | A | 8/1998 | Stroud | |
| 5,845,968 | A * | 12/1998 | Lovie | 297/256.1 |
| D558,990 | S | 1/2008 | Glance | |
| D560,375 | S | 1/2008 | Grohs | |
| 7,775,557 | B2 * | 8/2010 | Bostrom et al. | 280/801.1 |
| 2001/0000638 | A1 | 5/2001 | Kassai et al. | |
| 2002/0017808 | A1* | 2/2002 | Kain | 297/250.1 |
| 2005/0012372 | A1 | 1/2005 | Balogoa et al. | |
| 2008/0100051 | A1 | 5/2008 | Bell et al. | |
| 2008/0100122 | A1 | 5/2008 | Bell et al. | |
| 2008/0122214 | A1 | 5/2008 | Bell et al. | |

FOREIGN PATENT DOCUMENTS

| | | | |
|---|---|---|---|
| EP | 1927520 A1 | 6/2008 | |
| FR | 2539287 A1 * | 7/1984 | |
| GB | 2012568 A * | 8/1979 | |

* cited by examiner

*Primary Examiner* — Milton Nelson, Jr.
(74) *Attorney, Agent, or Firm* — Markell Seltzman; Lonnie R. Drayer

(57) ABSTRACT

A vehicle seat has a seat base and a seatback. The vehicle seat has as a permanent feature a pair of seat belt guides positioned such that when a lap portion of a seat belt webbing is received in both of the seat belt guides the lap portion of the seat belt webbing intersects the seat belt guides at a selected distance from a forward face of the seatback. Each of the seat belt guides restricts movement of the lap portion of the seat belt webbing away from the forward face of the seatback. The seat belt guides direct the lap portion of the seat belt webbing across the seat base along a path such that the lap portion of the seat belt webbing interacts with the lower body of a child when the vehicle seat is occupied by a child aged three to twelve years and under 150 cm in height.

4 Claims, 11 Drawing Sheets

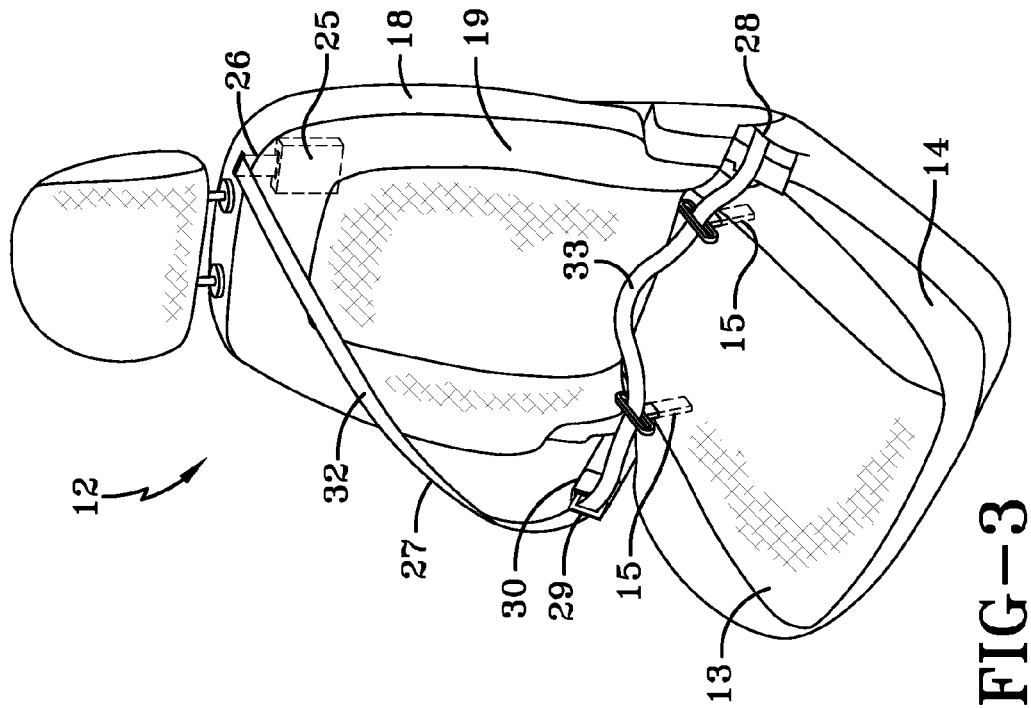
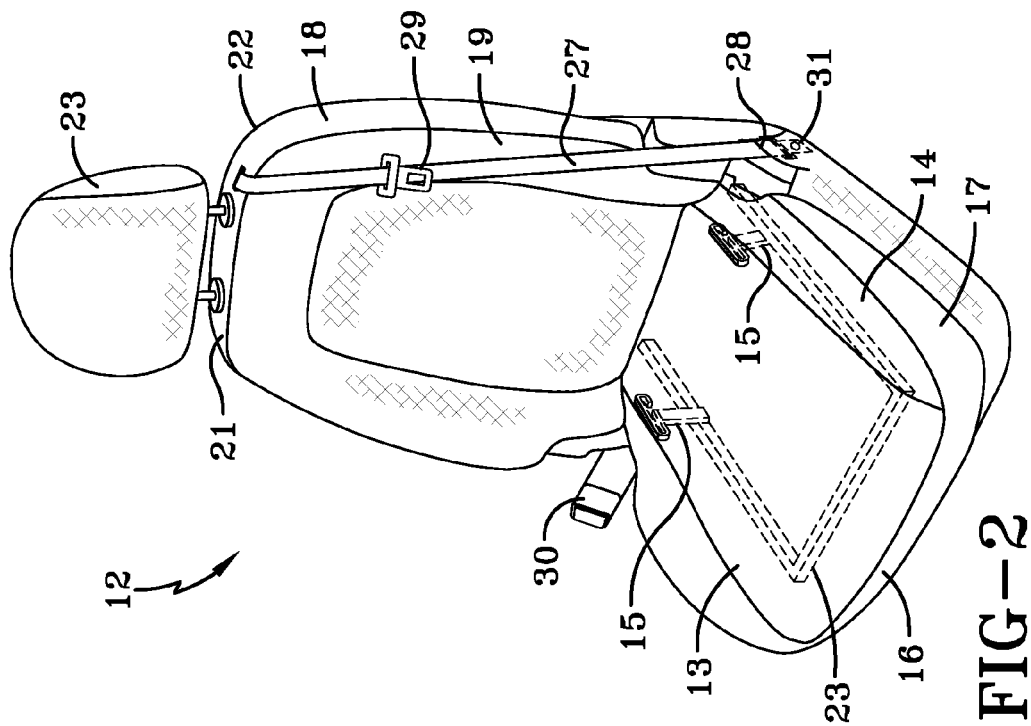

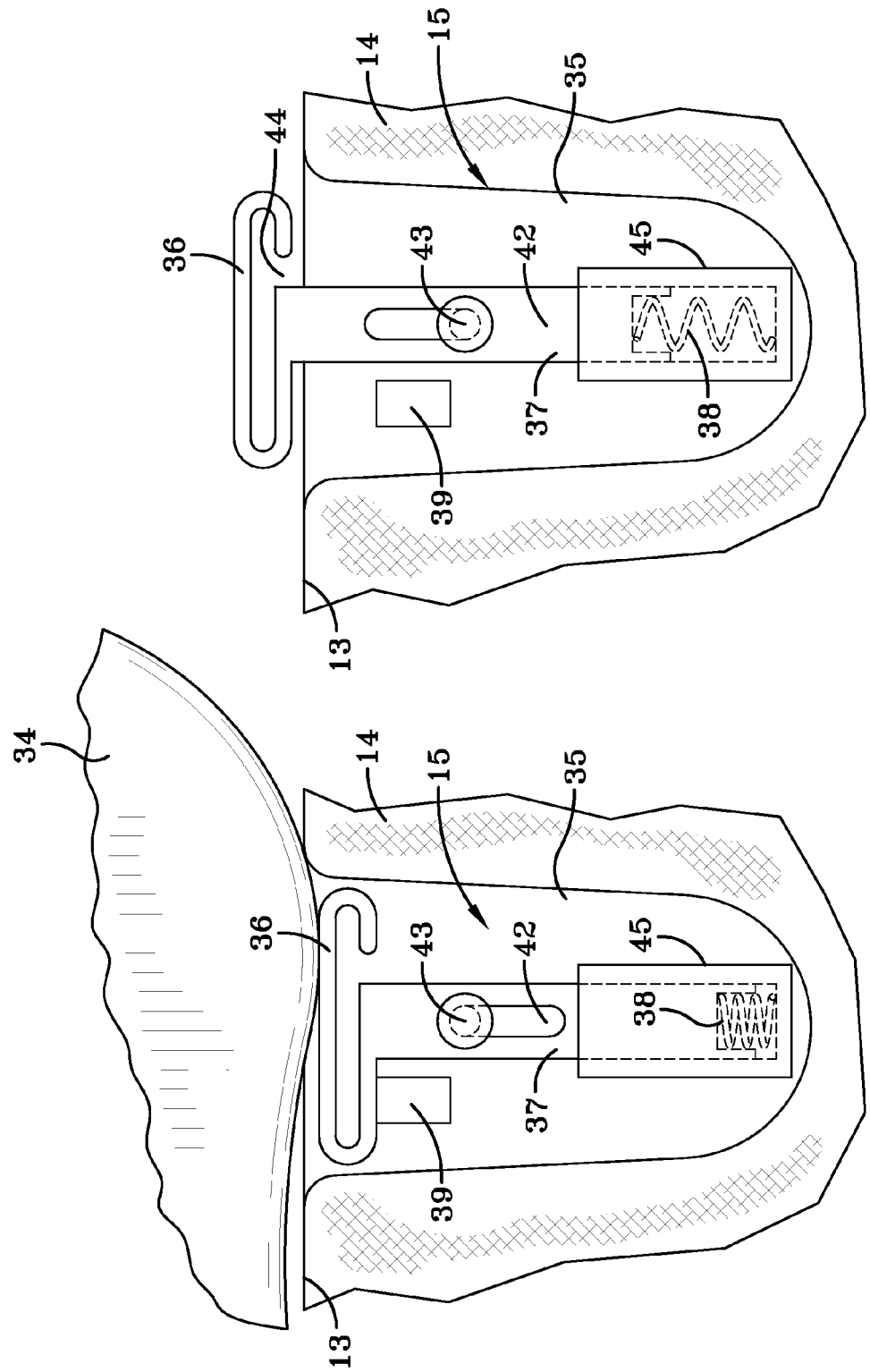

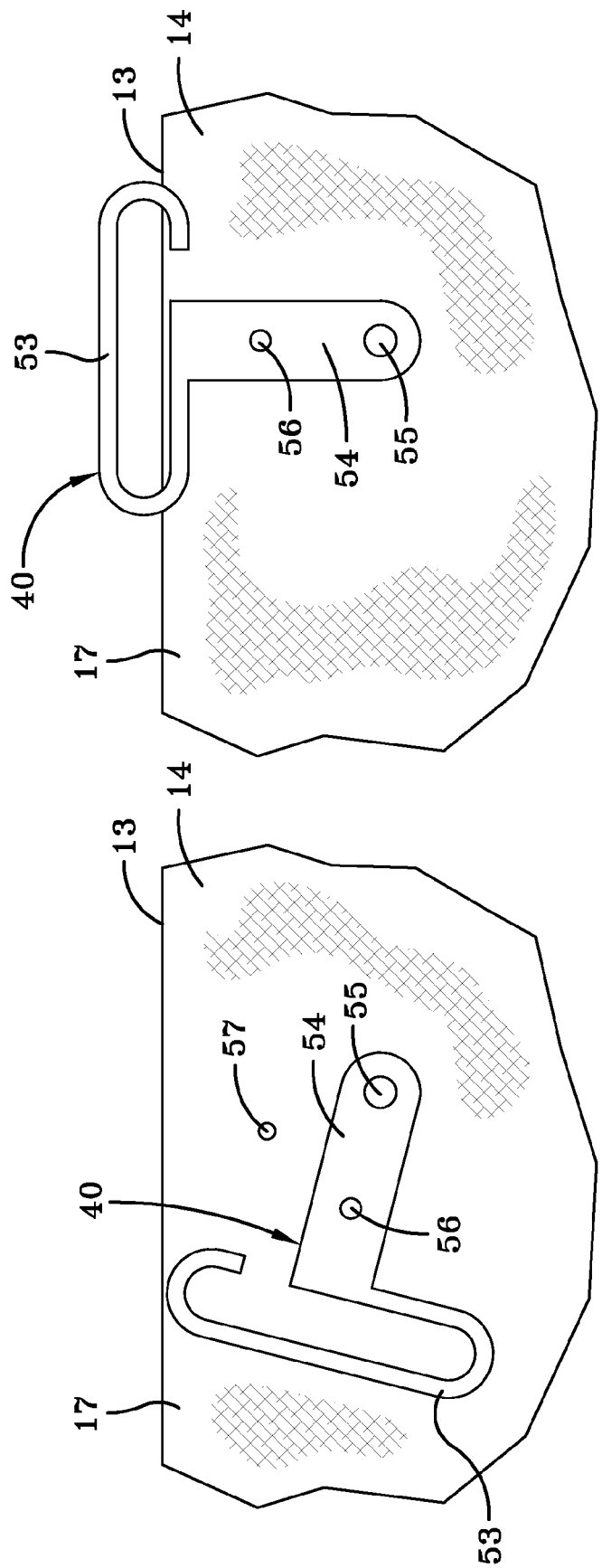

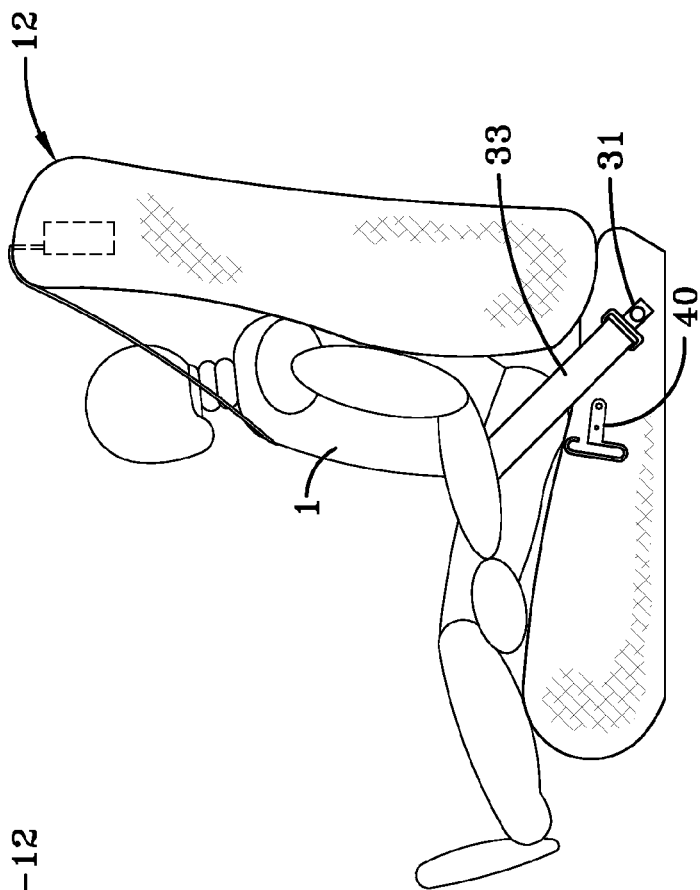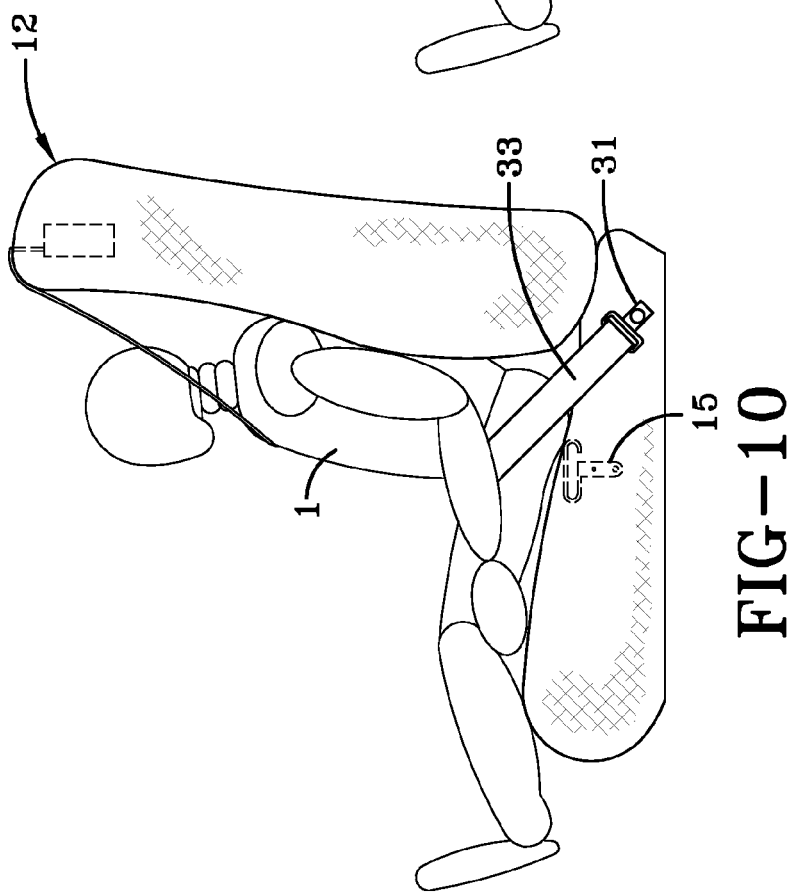

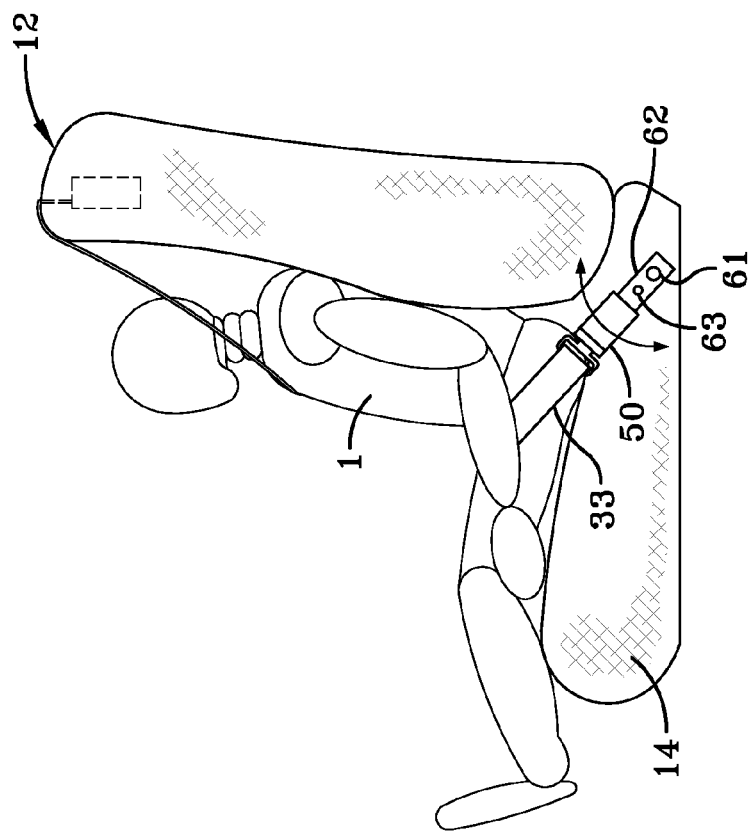
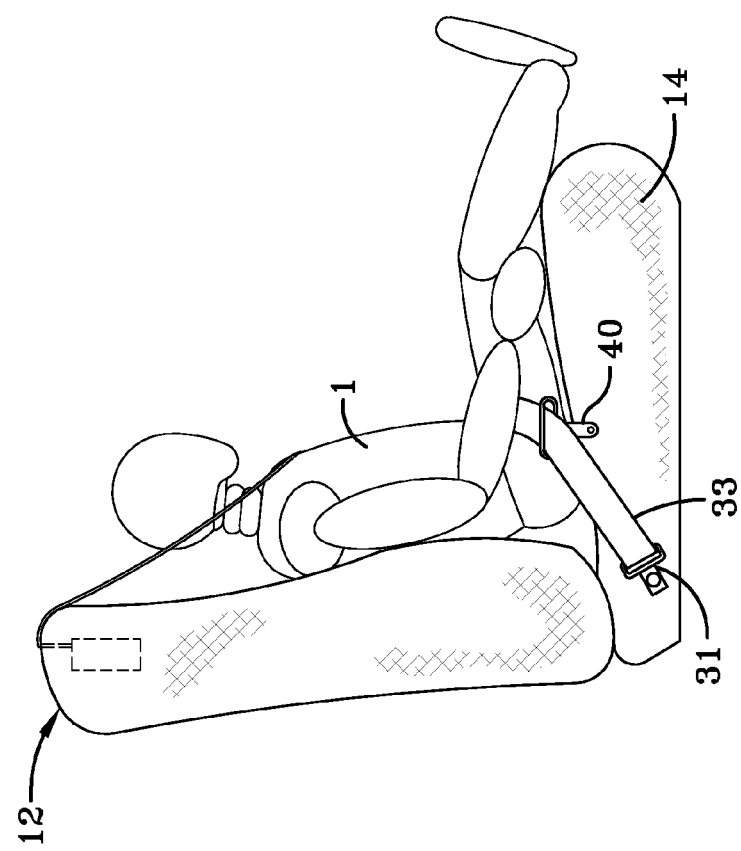

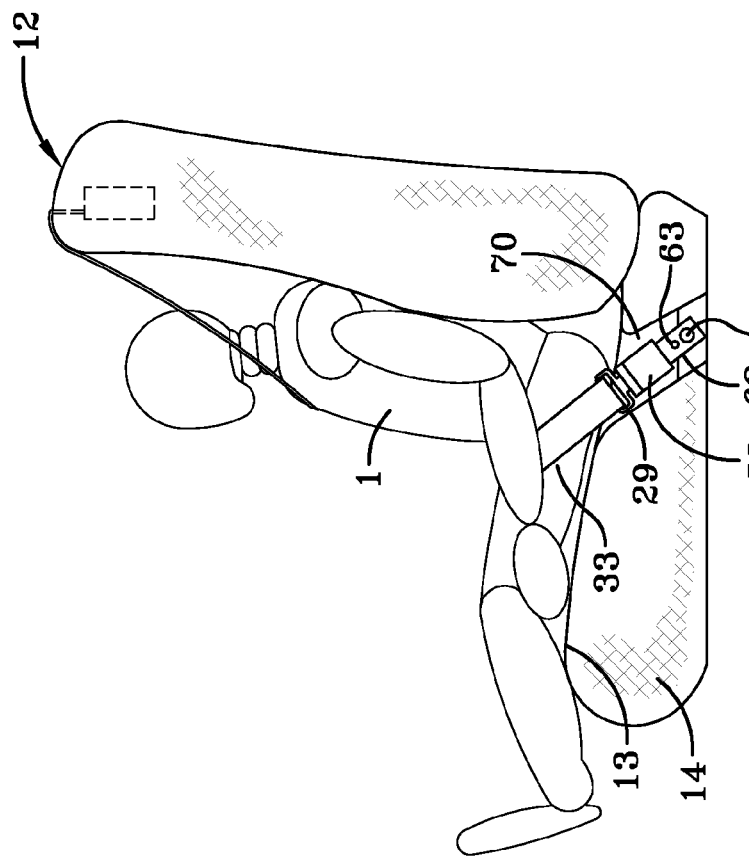
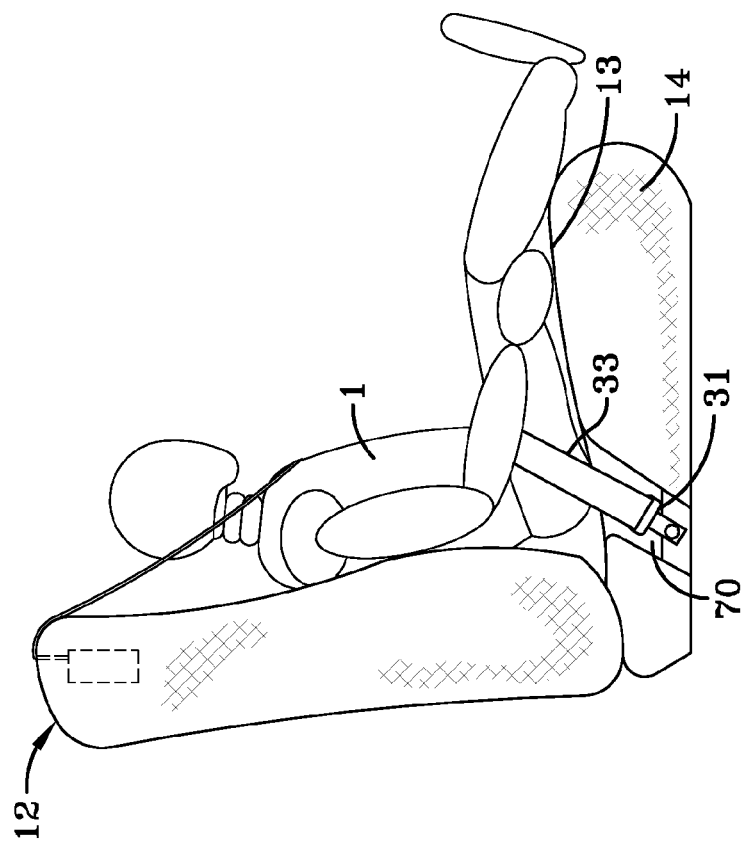

VEHICLE SEAT

FIELD OF THE INVENTION

The present invention relates to a vehicle seat equipped with seat belt guides that may be used to adapt a three point seat belt system for safer accommodation of a child occupying the vehicle seat.

BACKGROUND OF THE INVENTION

The use of a child booster seat in a vehicle to safely restrain a child in a vehicle seat is commonly required by government regulations and laws. A typical 3-point seat belt system cannot conveniently be used to restrain a child seated directly on the seat base of a typical vehicle seat because the seat belt webbing will not lie properly across the chest and in particular not low across the pelvis of the child. If the seat belt webbing of a seat belt system designed for an adult extends too high across a child's abdomen during a crash serious internal injury could result or the child could slide forward under the lap portion of the seat belt. FIG. 1 is a side elevation view of a child 1 occupying a typical vehicle seat 3 and sitting in a typical booster seat 5. The child's booster seat rests on the top face 7 of the seat base 6 of the vehicle seat to provide an elevated seating surface for the child. The booster seat has upstanding side walls 8. A recess 9 is formed in the front edge 10 of each side wall for receiving part of the seat belt webbing 20 of a typical 3-point seat belt system associated with the vehicle seat. The recess 9 is increased in depth downwardly at a location 11 spaced from the front edge 10 of the side wall 8 so as to resist separation of the seat belt webbing 20 from the booster seat 5, and separation of the booster seat 5 from the seat base 6. Typically a seat belt buckle tongue 2 is locked into a seat belt buckle 4 at a location above the seat base 6 to that it is juxtaposed with the side wall 8 of the booster seat.

Typical vehicle seats are associated with typical seat belt systems that are designed for adult use with the seat belt buckle positioned higher that the top face of the seat base for the convenience of an adult locking the seat belt buckle tongue with the seat belt buckle at a location that can be as much as 100 mm above the top face of the seat base. As a result of this configuration a lap portion of the seat belt if not redirected by the lower body of an adult would extend in a sloped path laterally across the seat base from a height of as much as 100 mm above the top face of the seat base to the opposite lateral edge of the seat base. It is to be understood that the term "lower body" refers to the portion of the human body below the waist. The lower body of a child seated directly on the seat base may not sufficiently engage the lap portion of the seat belt to adequately restrain the child to the vehicle seat. Hence the height of the seating surface of a typical booster seat is 100 mm high so that the lap portion of the seat belt directed by the belt guiding features of the booster seat properly engage the lower body of a child seated on the booster seat.

EC regulations require correct child restraints to be used for children aged three to twelve years and under 135 cm in height. Child restraints for children aged three to twelve years must be approved to R44.04. While adults responsible for enforcing a child's use of a booster seat have good compliance when a private automobile is used to transport a child, the inconvenience of toting a booster seat from vehicle to vehicle when using public conveyances, including school busses, results in lower compliance rates in such circumstances with children being inadequately restrained and protected. It is believed that the EC regulations could be complied with without the use of a booster seat by a vehicle seat according to the present invention.

SUMMARY OF THE INVENTION

There is provided in accordance with the present invention a vehicle seat having a seat base and a seatback. The vehicle seat having as a permanent feature a pair of seat belt guides positioned such that when a lap portion of a seat belt webbing is received in both of the seat belt guides the lap portion of the seat belt webbing intersects the seat belt guides at a selected distance from a forward face of the seatback, each of the seat belt guides restricts movement of the lap portion of the seat belt webbing away from the forward face of the seatback.

BRIEF DESCRIPTION OF THE DRAWINGS

FIG. 2 is a perspective view of a vehicle seat equipped with seat belt guides according to a first embodiment of the present invention with the seat belt guides in their inoperable positions lower than a top face of the seat base.

FIG. 3 is a perspective view of the vehicle seat of FIG. 2 with the seat belt guides in their operable positions level with or higher than the top face of the seat base.

FIG. 4 is an enlarged diagrammatic side view of a seat belt guide according to the first embodiment retracted downward in its inoperable position lower than a top face of the seat base, and FIG. 5 is an enlarged diagrammatic side view of the seat belt guide projected upward to its operable position level with or higher than the top face of the seat base.

FIG. 8 is an enlarged side view of a seat belt guide according to the second embodiment pivoted downward in its inoperable position lower than a top face of the seat base, and FIG. 9 is an enlarged diagrammatic view of the seat belt guide pivoted upward to its operable position level with or higher than the top face of the seat base.

FIG. 10 is a side elevation view of a child occupying a vehicle seat with the seat belt guides of FIGS. 2-5 being in their inoperable positions.

FIG. 10A is a side elevation view of a child occupying a vehicle seat with the seat belt guides of FIGS. 6-9 being in their inoperable positions.

FIGS. 12A and 12B are side elevations of a vehicle seat equipped with seat belt guides according to a third embodiment of the present invention wherein on one side of the seat base is located a seat belt guide according to FIGS. 6-9, and on the opposite side of the seat base a seat belt buckle functions also as a seat belt guide.

FIGS. 14 A and 14B are side elevations of a vehicle seat equipped with seat belt guides according to a fifth embodiment wherein the seat belt guides are channels in the side faces of the seat base.

DETAILED DESCRIPTION OF THE INVENTION

Figure 1:
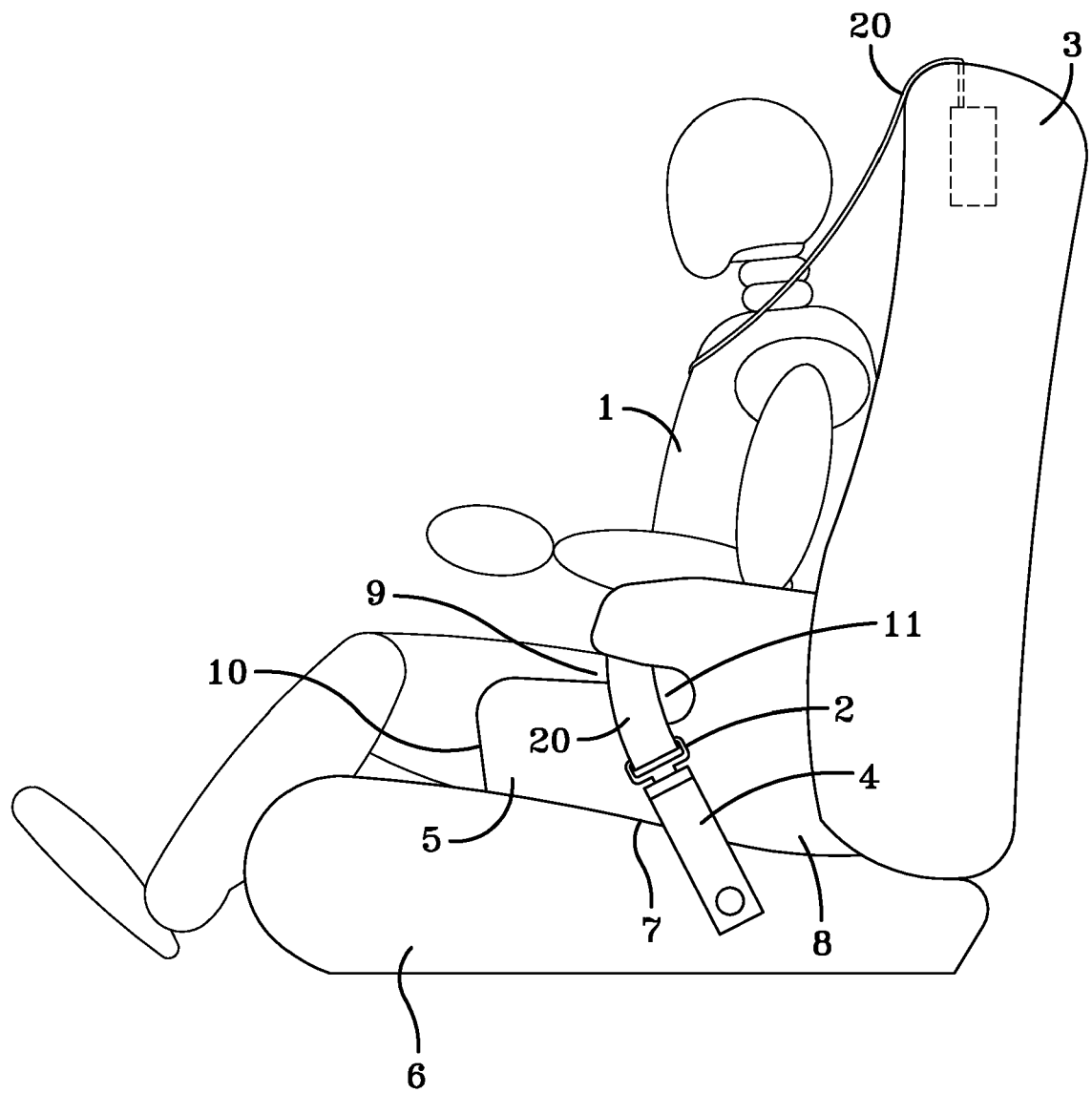
FIG. 1 is a side elevation view of a child sitting on a prior art booster seat in a vehicle seat.

FIG. 2 is a perspective view of an exemplary vehicle seat 12 according to the present invention having a seat base 14 comprising a seat base top face 13, a seat base forward face 16, and a pair of opposed seat base side faces 17. The vehicle seat also has a seatback 18 having a seatback forward face 19, a seatback top face 21, and a seatback rearward face 22. A headrest 23 may be movable with respect to the seatback 18 as shown in FIGS. 2-3, 6-7, 13A-13C and 14C, or the headrest may be integral with the seatback as shown in FIGS. 10-12B and 14A-14B. The seatback 18 may or may not be rotatably engaged to the seat base 14. The seat base 14 has a structural frame 23 which may be mounted on rails that allow the entire seat to move towards and away from the front of the vehicle a limited distance, or the vehicle seat may be fixed to the floor of the vehicle in a stationary location. Vehicle seats of the present invention are intended to be mounted in a vehicle with the seatback forward face 19 and the seat base forward face 16 facing the front of the vehicle.

As used herein and in the claims the term "vehicle" is understood to have its' common meaning of a means for transportation that transports people or objects. While vehicle seats of the present invention provide advantages when installed in motorcoaches, busses or vans that are used for public transport of both adults and children, it follows that a vehicle seat of the present invention may be installed in any suitable vehicle including trains, airplanes and motorcars.

With reference to FIGS. 2 and 3 an exemplary vehicle seat 12 according to the present invention may be assembled with a seat belt system, but it is understood that a vehicle seat may be manufactured without a seat belt system. It is a common practice in the vehicle manufacturing industries to purchase a vehicle seat from one manufacturer and later assemble a seat belt system from a second manufacturer with the vehicle seat when the vehicle seat is installed in a vehicle. In FIG. 2 the seat belt system is shown in a stored condition typically encountered when the vehicle seat is not occupied or when the seat is first occupied and the seat occupant has not yet buckled the seat belt. In FIG. 3 the seat belt system is shown in a seat occupant restraining configuration typically encountered when the seat is occupied. For the purpose of more clearly showing all of the components of the seat belt system in a single view, the seat occupant is omitted from FIG. 3. The seat belt system includes a seat belt retractor 25. While the seat belt retractor in FIG. 3 is located inside the seatback 18 fastened to a structural frame of the seatback, it is understood that the seat belt retractor may be secured to any appropriate component of a vehicle. A first end 26 of a length of seat belt webbing 27 is anchored to a rotatable spool of the seat belt retractor such that the seat belt webbing can be wound onto or protracted from the seat belt retractor. A second end 28 of the seat belt webbing is anchored by a seat belt anchor 31 at a location lower than the top face 13 of the seat base 14. While the second end of the seat belt webbing in FIGS. 2 and 3 is shown anchored to a seat belt anchor 31 fixed to a structural frame of the seat base, it is understood that the second end of the seat belt webbing may be anchored to any appropriate component of a vehicle including the floor of the vehicle. A seat belt buckle tongue 29 is attached to the seat belt webbing 27 such that the seat belt buckle tongue can slide along the seat belt webbing. The seat belt buckle tongue 29 is connectable with a seat belt buckle 30 to provide a three-point seat belt system having a torso portion 32 and a lap portion 33. The seat belt system may optionally comprise additional components that are well known in the art including for example pretensioners and tension relievers.

A vehicle seat of the present invention has as a permanent feature a pair of seat belt guides positioned such that when a lap portion of a seat belt webbing is received in both of the seat belt guides the lap portion of the seat belt webbing intersects the seat belt guides at a selected distance from a forward face of the seatback, each of the seat belt guides restricting movement of the lap portion of the seat belt webbing away from the forward face of the seatback.

The exemplary vehicle seat 12 shown in FIG. 2 is equipped with seat belt guides 15 according to a first embodiment of the present invention with the seat belt guides in their inoperable positions lower than a top face 13 of the seat base 14 so the seat can be used by an adult or a child in a booster seat or an infant in an infant seat. FIG. 3 is a perspective view of the vehicle seat 12 of FIG. 2 with the seat belt guides 15 in their operable positions level with or higher than the top face 13 of the seat base 14. A vehicle seat according to this embodiment has permanently affixed thereto a pair of optionally operable seat belt guides 15 having an operable position such that when the seat belt guides are in the operable position and a lap portion 33 of a seat belt webbing 27 is received in both of the seat belt guides the lap portion of the seat belt webbing intersects the seat belt guides at a selected distance from a forward face 19 the seatback 18. Each of the seat belt guides 15 restricts movement of the lap portion 33 of the seat belt 27 away from the forward face 19 of the seatback 18 and away from a top face 13 of the seat base 14. The seat belt guides 15 may be movable between an inoperable position and the operable position as will be described below.

In FIGS. 11-14C the seat belt guides 15, 40, 50, 51, 60, 70 are located with respect to the vehicle seat of the invention to be operable to direct the lap portion 33 of the seat belt across the seat base 14 along a path such that the lap portion of the seat belt interacts with the lower body of a child 1 when the vehicle seat is occupied by a child aged 3 to 12 years and under 150 cm in height. Thus, a vehicle seat according to the present invention may facilitate compliance with EC regulations that require correct child restraints to be used for children aged three to twelve years and under 135 cm in height.

FIG. 4 is a diagrammatic view of a seat belt guide 15 according to the first embodiment shown in FIGS. 2 and 3 retracted downward in its inoperable position lower than the top face 13 of the seat base 14, and FIG. 5 is a diagrammatic view of the seat belt guide projected upward to its operable position level with or above the top face 13 of the seat base 14. In this exemplary embodiment the seat belt guide 15 is fixed to a structural frame of the seat base in a manner whereby the seat belt guide 15 is raised and lowered vertically with respect to the top face 13 of the seat base 14.

As shown in FIGS. 2-5 the seat belt guide 15 is disposed in a recess or pocket 35 in the seat base 14. However, it is understood that a seat belt guide that is raised and lowered vertically in this same manner could alternatively be located at each of the side faces 17 of the seat base 14. Each seat belt guide 15 comprises a guiding portion 36 and a supporting portion 37 fixed to the guiding portion. The seat belt guide is movable vertically such that the guiding portion 36 moves between an inoperable position that is vertically lower than the top face 13 of the seat base 14 and an operable position that is level with or vertically higher than the top face of the seat base.

As shown in FIGS. 4 and 5 the seat belt guides 15 are spring loaded with a helical spring 38 so the vehicle seat can be occupied by an adult 34, or by an infant in an infant seat, or by a child in a booster seat, with the body of the adult or the infant seat or the booster seat compressing the helical spring 38 in a well 45 to move and retain the seat belt guide in an inoperable position. A slot 42 in the supporting portion 37 of the seat belt guide cooperates with a pin 43 that is fixed to a structural member of the seat base and has a shaft extending through the slot to control the vertical path and extent of travel of the seat belt guide. A stop 39 also limits the downward travel of the seat belt guide. It is understood that if desired the seat belt guide may be retained in its inoperable position when the seat is unoccupied, for example by having the guiding portion 36 interact with the stop 39 in a releasable manner such as a magnetic interface.

The guiding portion 36 of the seat belt guide 15 is shown extending perpendicular to the supporting portion 37, with the guiding portion in its operable position oriented extending horizontally in a direction going from the seat base forward face 16 towards the forward face 19 of the seatback. In side profile the guiding portion 36 has the shape of an elongated loop with a gap 44 in the loop through which the lap portion of the seat belt webbing is received into the loop.

When the seat belt guides are in their operable positions with the lap portion of the seat belt extending through their guiding portions and the seat belt is buckled, movement of the lap portion of the seat belt away from the forward face of the seatback and away from a top face of the seat base is restricted. While the section 46 of the loop directed towards the seat back could be omitted, it is good to have the configuration shown for the guiding portion 36 because with this configuration movement of the lap portion of the seat belt towards the forward face of the seat back is also restricted.

Figure 7:
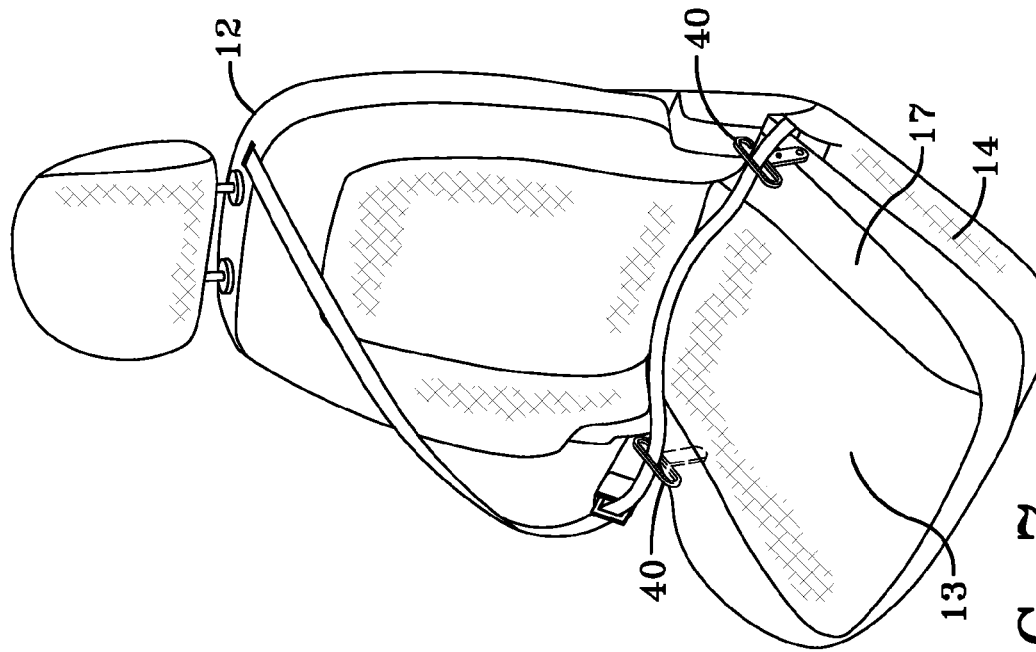
FIG. 7 is a perspective view of the vehicle seat of FIG. 6 with the seat belt guides pivoted upward in their operative positions level with or higher than the top face of the seat base.
Figure 6:
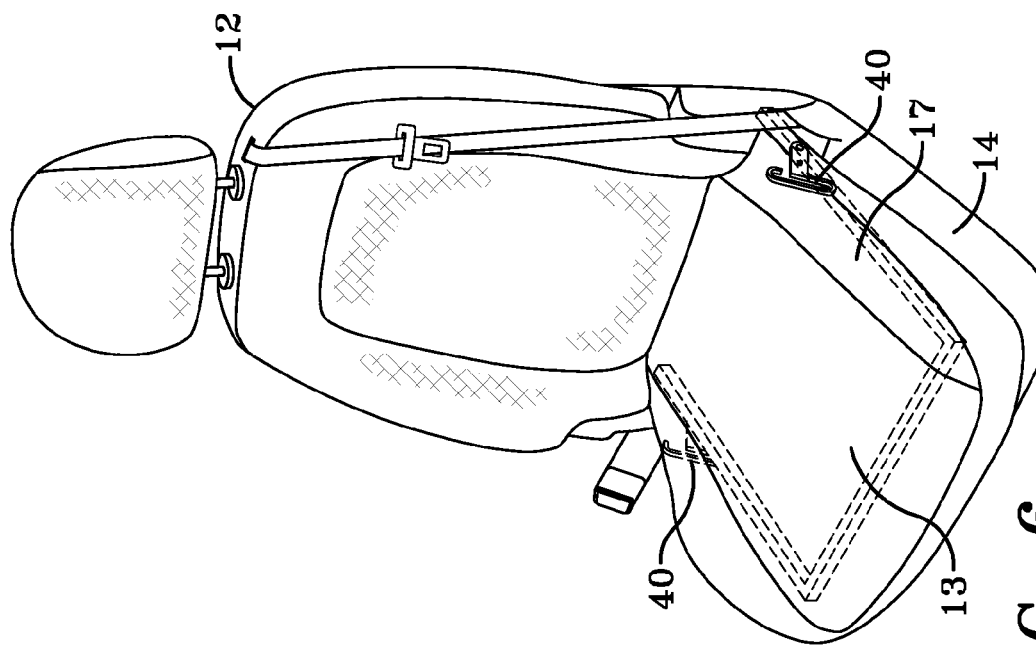
FIG. 6 is a perspective view of a vehicle seat equipped with seat belt guides according to a second embodiment of the present invention with the seat belt guides pivoted downward in their inoperable positions lower than a top face of the seat base.

FIG. 6 is a perspective view of a vehicle seat 12 substantially like that shown in FIGS. 2 and 3 equipped with seat belt guides 40 according to a second embodiment of the invention with the seat belt guides located at opposing side faces 17 of the seat base 14 and pivoted downward in their inoperable positions lower than a top face 13 of the seat base 14 so the seat can be used by an adult or with an infant seat or a child's booster seat. FIG. 7 is a perspective view of the vehicle seat of FIG. 6 with the seat belt guides 40 pivoted upward in their operative positions level with or higher than the top face 13 of the seat base 14.

FIG. 8 is an enlarged side view of a seat belt guide 40 according to FIGS. 6 and 7 pivoted downward in its inoperable position, and FIG. 9 is an enlarged diagrammatic view of the seat belt guide pivoted upward to its operable position level with or higher than the top face of the seat base. As in the first embodiment each of seat belt guides 40 comprises a guiding portion 53 and a supporting portion 54 fixed to the guiding portion. The configuration, orientation and function of the guiding portion 53 of the seat belt guides of this embodiment are the same as described above with respect to the guiding portions 36 of the first embodiment. However, in this embodiment the supporting portion 54 of each of the seat belt guides is fixed to a structural frame 23 of the seat base in a manner whereby the seat belt guide pivots about a fulcrum 55 to raise and lower the guiding portion 53 with respect to the top face 13 of the seat base 14. The supporting portion 54 is secured in a vertical orientation by a suitable releasable securing means such as a pin 56 and a hole 57 in the structure of the seat base for receiving the pin.

Figure 11:
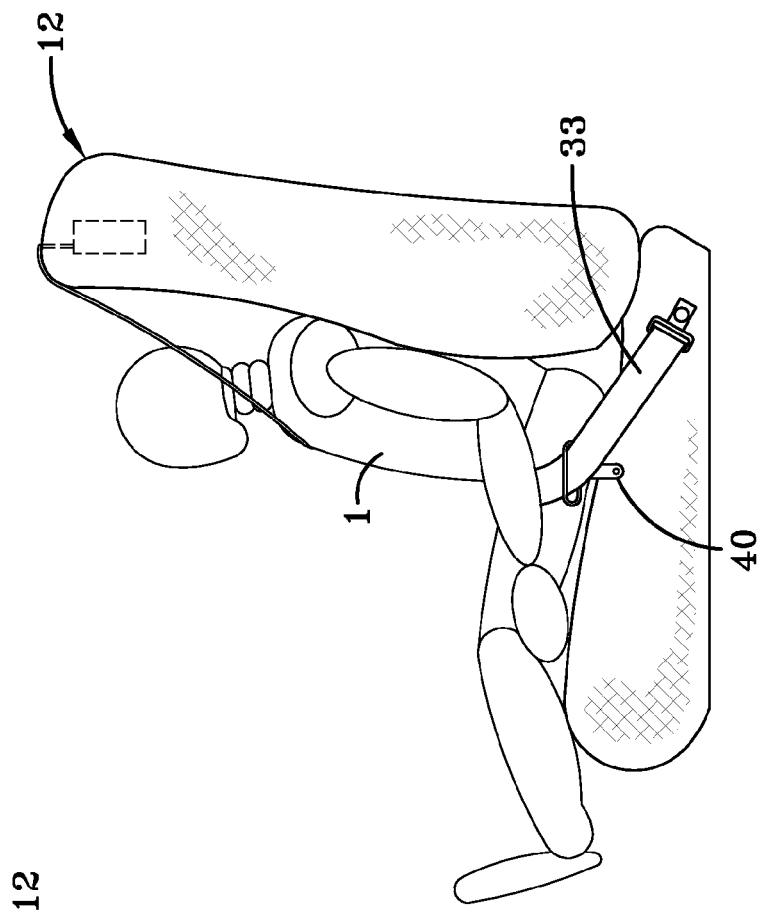
FIG. 11 is a side elevation view of a child occupying a vehicle seat with the seat belt guides of FIGS. 2-5 in their operable positions.
Figure 11A:
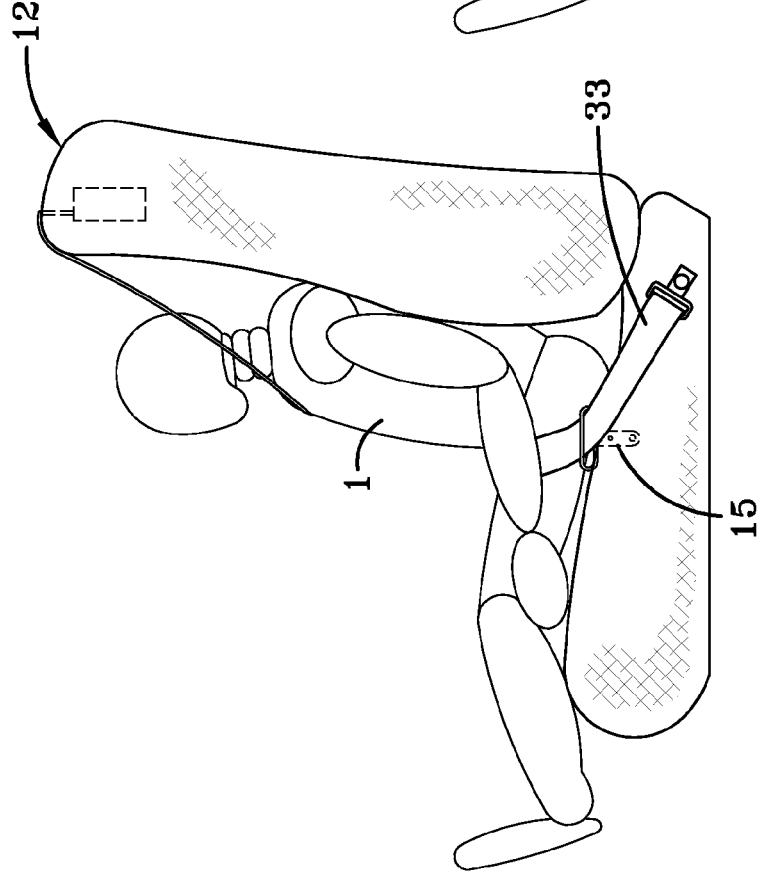
FIG. 11A is a side elevation view of a child occupying a vehicle seat with the seat belt guides of FIGS. 6-9 in their operable positions.

FIG. 10 is a side elevation view of a child 1 occupying a vehicle seat 12 restrained by a seat belt system with the seat belt guides 15 of FIGS. 2-5 in their inoperable positions, and FIG. 11 shows the same child restrained by the same seat belt system with the seat belt guides of FIGS. 2-5 in their operable positions. FIG. 10A is a side elevation view of a child 1 occupying a vehicle seat with the seat belt guides 40 of FIGS. 6-9 in their inoperable positions, and FIG. 11A shows the same child restrained by the same seat belt system with the seat belt guides of FIGS. 6-9 in their operable positions. The functioning of the seat belt guides to redirect the lap portion 33 of the seat belt webbing is clearly demonstrated by comparing FIGS. 10 and 10A to FIGS. 11 and 11A.

FIGS. 12A and 12B are side elevations of a child 1 seated on a vehicle seat 12 equipped with seat belt guides 40; 50 according to a third embodiment of the present invention. As shown in FIG. 12A one of the seat belt guides has a guiding portion and a supporting portion fixed to the guiding portion as described above with regards to FIGS. 2-9 wherein the seat belt guide is movable from a inoperable position that is vertically lower than the top face of the seat base to the operable position shown in FIG. 12A that is level with or vertically higher than the top face of the seat base 14. While in FIG. 12A a seat belt guide 40 according to the second embodiment of FIGS. 6-9 is shown, it is understood that this seat belt guide may be either (a) a seat belt guide 15 like the first embodiment fixed to a structural frame of the seat base in a manner whereby the seat belt guide is raised and lowered vertically with respect to the top face of the seat base, or (b) a seat belt guide 40 like the second embodiment fixed to the structural frame of the seat base 14 in a manner whereby the seat belt guide 40 pivots about a fulcrum to raise and lower the guiding portion with respect to the top face of the seat base.

As shown in FIG. 12B on the other side of the seat base 14 a seat belt buckle 50 functions both as a buckle and as a seat belt guide. The seat belt buckle can be pivoted about a fulcrum 61 to an operative position where it operates as a seat belt guide to direct the lap portion of the seat belt in a path to such that the lap portion of the seat belt webbing interacts with the lower body of a child when the vehicle seat is occupied by a child aged three to twelve years and under 150 cm in height. The seat belt buckle can be pivoted about a fulcrum 61 to a second position where the seat belt buckle interacts with the lower body of an adult occupying the vehicle seat in the usual manner The stalk 62 of the seatbelt buckle 50 has incorporated with it a pin mechanism 63 that mates with holes in the structure of the seat base to secure the seat belt buckle in the position selected in accordance with whether the vehicle seat is occupied by either (a) a child or (b) an adult, an infant in an infant seat, or a child in a booster seat.

Figure 13A:
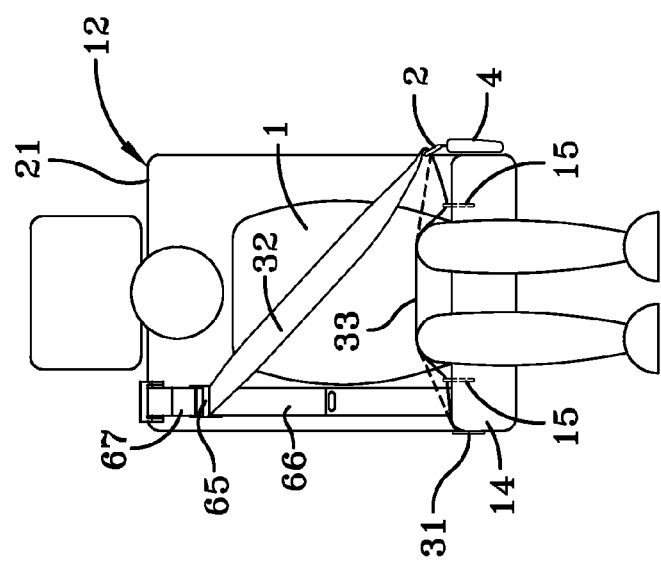
FIG. 13A is a front view of a vehicle seat equipped with the seat belt guides of FIGS. 2-5 in their operable positions, the location of an upper end of the torso portion of the seat belt being adjustable to accommodate children of different heights.

FIG. 13A is a front view of a child 1 seated in vehicle seat 12 equipped with the seat belt guides 15 of FIGS. 2-5 in their operable positions. The manner in which the seat belt guides direct the lap portion 33 to interact with the lower body of the child in a safe restraining manner as opposed to the path shown by a dashed line that the lap portion of the seat belt would follow in the absence of the seat belt guides is very apparent in this figure. In FIG. 13 the seat belt system includes features whereby the location of an upper end 65 of the torso portion 32 of the seat belt webbing is adjustable to accommodate children of different heights. A vertically extending strap 66 is secured fairly tightly against the forward face of the seatback and a movable seat belt webbing guide 67 has passageways for both the strap 66 and the seat belt webbing such that the movable seat belt webbing guide can slide along the strap to determine the location of an upper end 65 of the torso portion 32 of the seat belt webbing to accommodate the height of the shoulder of the child 1. The movable seat belt webbing guide is clamped in place on the strap, or otherwise secured at the desired height. If an adult is occupying the seat the movable seat belt webbing guide 67 is moved to a location in the region of the top face 21 of the seatback. Seat belt systems wherein the location of an upper end of the torso portion of the seat belt being adjustable to accommodate children of different heights are taught for example in US 2008/0100051 A1, US 2008/0100122 A1, and US 2008/0122214 A1, each of which is incorporated herein in the entirety by reference for the purpose of teaching a seat belt system wherein the location of an upper end of the torso portion of the seat belt is adjustable to accommodate children of different heights.

Figure 13B:
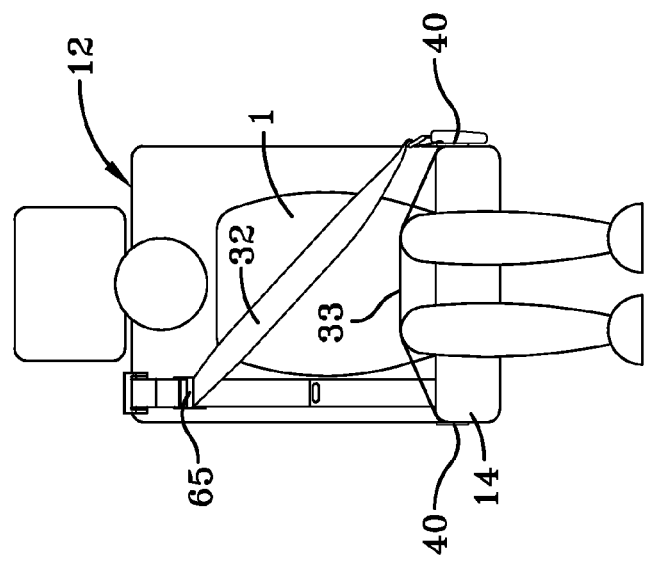
FIG. 13B is a front view of a vehicle seat equipped with the seat belt guides of FIGS. 6-9 in their operable positions, the location of an upper end of the torso portion of the seat belt being adjustable to accommodate children of different heights.

FIG. 13B is a front view of a child 1 seated on the seat base 14 of a vehicle seat 12 vehicle seat equipped with the seat belt guides 40 of FIGS. 6-9 in their operable positions. The manner in which the seat belt guides direct the lap portion 33 to interact with the lower body of the child in a safe restraining manner is shown clearly in this view. Like the seat shown in FIG. 13A this seat is also provided with a seat belt system wherein the location of an upper end 65 of the torso portion 32 of the seat belt webbing is adjustable to accommodate children of different heights.

Figure 13C:
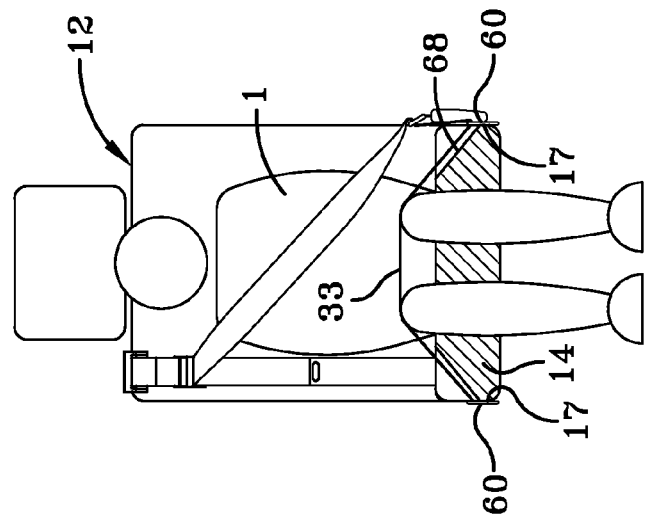
FIG. 13 C is a front view, partially in section, of a vehicle seat equipped with seat belt guides according to a fourth embodiment that are permanently fixed in their operable positions at lateral edges of the seat base.

FIG. 13C is a front view, partially in section, of a vehicle seat 12 equipped with seat belt guides 60 according to a fourth embodiment. The seat belt guides 60 are permanently fixed in their operable positions at opposed side faces 17 of the seat base 14. At each lateral side of the seat base top face 13 a beveled face 68 of the seat base connects the seat base top face 13 to one of the opposed seat base side faces 17. The seat belt guides 60 may have the same basic design as the seat belt guides 15, 40 disclosed in FIGS. 2-9, but here each of the seat belt guides is secured to a side face 17 of the seat base in a stationary manner with at least part of the guiding portion of the seat belt guide 60 vertically aligned with the nearest beveled face 68 of the seat base 14. Like the seat shown in FIG. 13A this seat is also provided with a seat belt system wherein the location of an upper end 65 of the torso portion 32 of the seat belt webbing is adjustable to accommodate children of different heights.

Figure 14C:
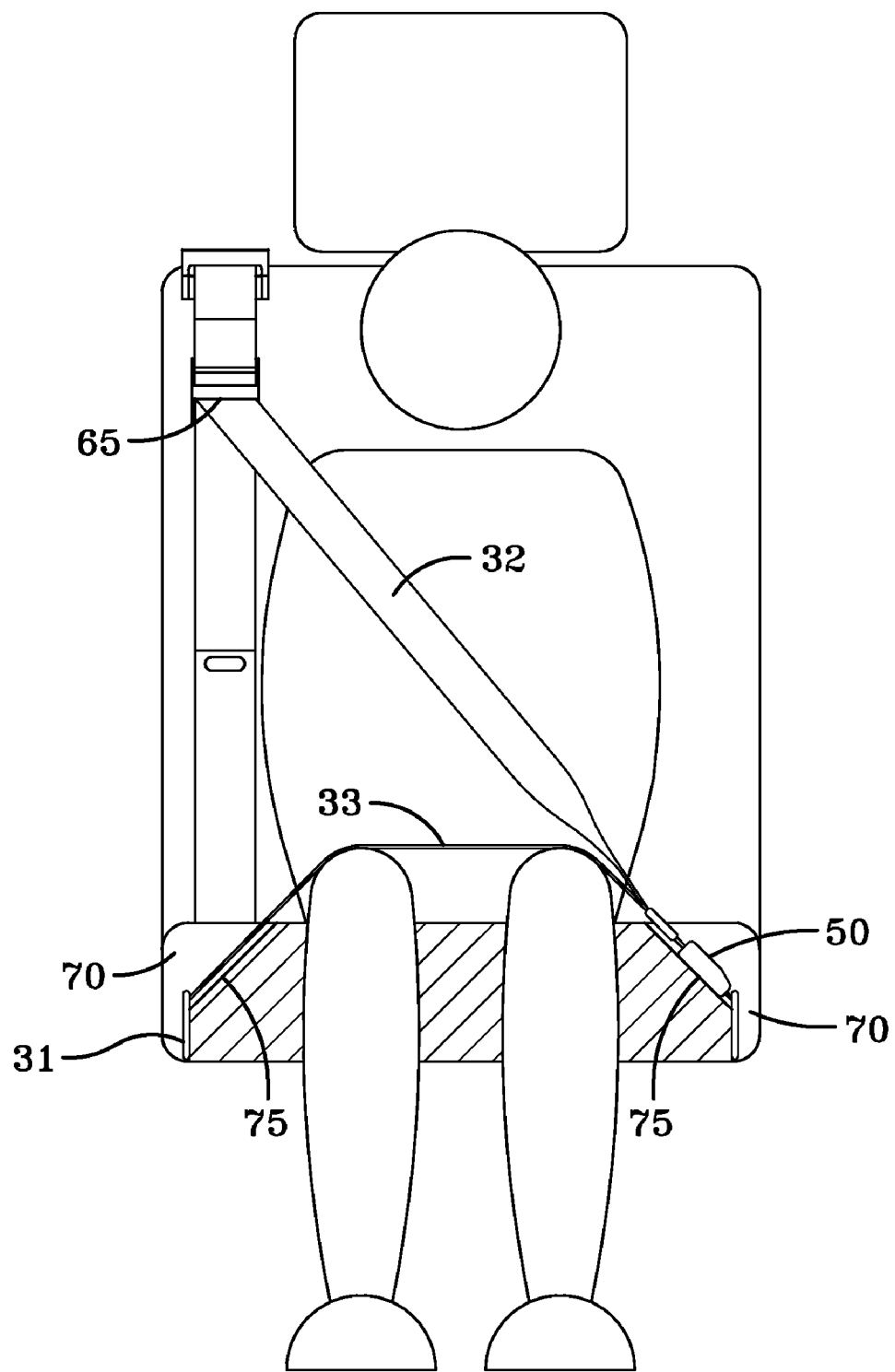
FIG. 14C is a front section view of a vehicle seat equipped with seat belt guides of FIGS. 14A and 14B with the location of an upper end of the torso portion of the seat belt being adjustable to accommodate children of different heights.

FIGS. 14A and 14B are side elevations of a vehicle seat 12 equipped with seat belt guides according to a fifth embodiment wherein the seat belt guides are channels 70 in the opposed side faces of the seat base 14. The channels 70 extend downwardly from the top face 13 of the seat base 14. As shown in FIG. 14A located within the channel in one of the side faces is a seat belt anchor 31 anchor fixed to the structural frame of the seat base for anchoring a seat belt. As shown in FIG. 14B located within the channel 70 in the other side face is a seat belt buckle 60 for receiving a seat belt buckle tongue 29 associated with a seat belt webbing. Each of the channels 70 has at the deepest part of the channel a base portion that communicates with a top face 13 of the seat belt base 14 via a bevel 75 that is best shown in FIG. 14C which is a front view, partially in section, of the vehicle seat of FIGS. 14A and 14B equipped with seat belt guides of FIGS. 14A and 14B provided with a seat belt system wherein the location of an upper end 65 of the torso portion 32 of the seat belt webbing is adjustable to accommodate children of different heights.

Referring to FIG. 14B, if desired the stalk 62 of the seatbelt buckle 50 may be constructed to pivot about a fulcrum 61 and the stalk has incorporated with it a pin mechanism 63 that mates with holes in the structure of the seat base to secure the seat belt buckle in the position selected. Referring to FIG. 14A the seat belt webbing anchor 31 may be constructed with a pivot feature also.

While the preferred embodiments of the present invention have been shown and described, it will be obvious in the art that changes and modifications may be made without departing from the teachings of the invention. The matter set forth in the foregoing description and accompanying drawings is offered by way of illustration only and not as a limitation. The actual scope of the invention is intended to be defined in the following claims.

The invention claimed is:

1. A vehicle seat comprising a seat base and a seatback, the vehicle seat having as permanent features a seat belt with seat belt webbing and a pair of seat belt guides positioned such that when a lap portion of the seat belt webbing extending across the top face of the seat base is received in both of the seat belt guides the lap portion of the seat belt webbing intersects the seat belt guides at a selected distance from a forward face of the seatback, each of the seat belt guides restricting movement of the lap portion of the seat belt webbing away from the forward face of the seatback;

the seat base has a pair of opposed side faces, each side face including a channel extending downwardly from a top face of the seat base, each channel forms one of the seat belt guides, wherein located within a first channel is an anchor fixed to a frame of the seat base securing an end of seat belt webbing and located within the other channel is a seat belt buckle secured to the frame of the seat base and adapted to receive a seat belt tongue which is on the seat belt, and wherein the seat belt guides formed as the channels with the webbing anchor in one channel and the buckle in the other channel restricts movement of the lap portion of the seat belt webbing away from the top face of the seat base.

2. The vehicle seat of claim 1 wherein each of the channels at a deepest part of the channel has a base portion that communicates with a top face of the seat base via a bevel, both the anchor and an end of the buckle being secured to the frame at the base portion.

3. The vehicle seat of claim 1 including a seat belt retractor with an end of the seat belt webbing anchored to a rotatable spool of the seat belt retractor such that the seat belt webbing can be wound onto or protracted from the seat belt retractor, and a second end of the seat belt webbing anchored to any appropriate structure, the seat belt tongue attached to the seat belt webbing such that the seat belt tongue can slide along the seat belt webbing, the seat belt tongue being connectable with the seat belt buckle to provide a three-point seat belt system having a torso portion and a lap portion.

4. The vehicle seat of claim 3 wherein the seat belt system further comprises a means for adjusting the height of the upper end of the torso portion of the seat belt webbing.

* * * * *